Patented Aug. 17, 1954

2,686,799

UNITED STATES PATENT OFFICE 2,686,799

PROCESS FOR MAKING TETRAETHYL LEAD

Charles L. Hobbs, Jr., Wilmington, Del., assignor to E. I. du Pont de Nemours & Company, Wilmington, Del., a corporation of Delaware No Drawing. Application February 19, 1952,
Serial No. 272,500

3 Claims. (Cl. 260—437)

This invention relates to a process for making tetraethyl lead and more particularly to stabilization of reaction masses obtained by reacting lead monosodium alloy with an excess of ethyl chloride.

Tetraethyl lead has been manufactured for many years by reacting lead monosodium alloy with ethyl chloride in autoclaves by the batch process. More recently, continuous processes have been developed whereby molten lead monosodium alloy and liquid ethyl chloride, in a proportion of from about 2 to about 6 parts by weight based on the alloy, are mixed and passed through a horizontal reaction zone with agitation and the reaction mixture is continuously withdrawn from the reaction zone and passed to equipment for separating the constituents thereof, the reaction mass being frequently first passed from the reaction zone to a temporary storage vessel where it is agitated to maintain the solids in suspension. In such process, the products formed are tetraethyl lead, metallic lead, sodium chloride and excess ethyl chloride, the metallic lead and sodium chloride being in finely-divided form and constituting the solid phase and the tetraethyl lead being dissolved in the ethyl chloride and forming the liquid phase.

When a large excess of ethyl chloride is present, as when the reaction is carried out with 2 to 6 parts by weight of ethyl chloride per part of alloy, the reaction mass is a thin slurry which can be handled as a liquid and which thus makes it possible to carry out the process in a continuous manner. The solid particles in such slurries are initially very small and can readily be kept in suspension by agitation, but settle rapidly in the absence of agitation. Accordingly, it is essential to agitate the mass so as to maintain the solids in suspension during the reaction and the subsequent handling of the resulting slurry, so that the slurry can be readily discharged from the reactor and flowed through pipes and other equipment.

However, if such slurries are agitated for any material length of time, the particles of lead tend to agglomerate, eventually yielding hard, compact aggregates which are difficult or impossible to maintain in suspension and which contain occluded sodium chloride, tetraethyl lead, and ethyl chloride which cannot be readily separated from such aggregates. Various forms of apparatus for the continuous manufacture of tetraethyl lead can be designed so that the slurry, as it passes through the apparatus, is agitated sufficiently to keep the finely-divided particles in suspension. If the residence time of the slurry in the equipment is reasonably short, serious agglomeration of the particles usually will not take place. Obviously, however, it is not always possible to operate such equipment so that the residence time will be short, but, usually, the residence time will be sufficiently long so that the tendency for agglomeration becomes serious. Moreover, the choice of practical continuous processes is much limited if a short residence time is required. Therefore, it is highly desirable to find a method for preventing the particles from agglomerating to a serious extent during extended agitation.

It is an object of my invention to provide an improved process for manufacturing tetraethyl lead. Another object is to provide a process for manufacturing tetraethyl lead whereby the particles of lead in the reaction mass are maintained in finely-divided form and agglomeration thereof is largely prevented when the reaction mass is agitated in the reaction zone and in the subsequent handling equipment. A further object is to provide a process for manufacturing tetraethyl lead in the presence of agents which largely inhibit agglomeration of the finely-divided lead when agitated and which do not seriously affect the reaction or the yields of tetraethyl lead obtained thereby. Other objects are to advance the art. Still other objects will appear hereinafter.

The above and other objects may be accomplished in accordance with my invention which comprises carrying out the reaction of lead monosodium alloy with an excess of liquid ethyl chloride in the presence from about 0.02% to about 1% by weight, based on the ethyl chloride, of an oil-soluble surface-active material of the class of alkaline earth salts of sulfonated petroleum hydrocarbons of at least 8 carbon atoms, alkaline earth salts of naphthenic acids, fatty acid esters of hexitans in which the fatty acids contain from 12 to 20 carbon atoms, copolymers of from about 70 to 99 parts by weight of at least one polymerizable compound selected from the alkyl acrylates and alkyl methacrylates in which each alkyl group contains 10 to 18 carbon atoms with from about 30 to 1 part by weight of at least one other polymerizable compound selected from beta-dialkylaminoethyl acrylates and beta-dialkylaminoethyl methacrylates in which each alkyl group contains 1 to 8 carbon atoms.

I have found that, when the reaction is carried out in the presence of such oil-soluble surface-active materials, the solids in the reaction mass are obtained in an extremely finely-divided condition and do not readily agglomerate or agglomerate to any significant extent when agitated over extended periods of time. Such results are of particular importance in the continuous processes for making tetraethyl lead, as they eliminate difficulties due to agglomeration and settling of the solids in the equipment even though long residence times are involved.

The reaction may be carried out in the usual manner and under the usual conditions, except, of course, for the presence of the oil-soluble surface-active material. Preferably, the reaction will be carried out in a continuous manner by feeding molten lead monosodium alloy and from about 2 to about 6 parts by weight based on the alloy of ethyl chloride containing the oil-soluble surface-active agent into a mixing zone and flowing the mixture through a horizontal reaction zone while causing them to react at a temperature of from about 80° C. to about 120° C. and a corresponding pressure of from about 107 to about 255 pounds per square inch absolute sufficient to maintain a major portion of the ethyl chloride in the liquid state, while permitting some of the ethyl chloride to reflux so as to assist in the control of the temperature, and continuously withdrawing the reaction mass from the reaction zone to equipment for recovering and separating the constituents of the reaction mass, usually passing the reaction mass from the reaction zone to a temporary storage vessel before passing it to the recovery system. Also, preferably, the ethyl chloride will contain a small amount of acetone or other agent for accelerating the reaction, such agents being well known to the art.

By "oil-soluble" surface-active materials, I mean materials which are soluble in hydrocarbon oils, such as petroleum oils, to the extent of at least 1% by weight. The alkaline earth metals in the surface-active materials are represented by magnesium, calcium, strontium and barium. The sulfonated petroleum hydrocarbons of at least 8 carbon atoms are well known sulfonic acids obtained in the refining of petroleum hydrocarbons whereby the unsaturated hydrocarbons are reacted with sulfuric acid to form the sulfonates. The hexitans are well known compounds which are the inner anhydrides of hexitols. The preferred hexitans are those which are formed by dehydrating sorbitol. The preferred esters of the hexitans are those in which the hexitans are esterified with 3 molecular proportions of the fatty acids. The salts of naphthenic acids and the copolymers, which are to be employed in accordance with my invention, are also well known surface-active materials, which have been used as detergents in other materials, such as lubricating oils.

In order to more clearly illustrate my invention, preferred modes of carrying the same into effect and the advantageous results to be obtained thereby, the following examples are given in which the parts are by weight:

*Example 1*

Sodium lead alloy (52 g.) (containing 10% sodium), ground and screened so as to pass through a No. 10 sieve but not through a No. 16 sieve, was heated for 10 minutes at 90° C. with 296 g. of ethyl chloride containing 0.3 g. of acetone and 0.3 g. of a solution of calcium naphthenates in kerosene, analyzing 5% calcium, and containing about 0.1 g. of calcium naphthenates. The reaction was carried out in a rotating bomb. There was formed an extremely fine dispersion which passed largely through ordinary filter paper and which remained finely-divided even after agitation in the rotating bomb for 5 hours at about 60 R. P. M. The yield of tetraethyl lead was 88%, based on the alloy added. When the experiment was repeated without the calcium naphthenate, the yield was the same, 88%, but the dispersion, when agitated in the same way for 5 hours, was agglomerated to form particles .05–.1 inch in diameter.

*Example 2*

When the kerosene solution of calcium naphthenates of Example 1 was replaced by a kerosene solution of an equal quantity of a commercial calcium petroleum sulfonate, similar results were obtained.

*Example 3*

Likewise, the use of 0.3 g. of sorbitan trioleate, in place of the kerosene solution of Example 1, gave a similar fine dispersion.

*Example 4*

Example 1 was modified by using 1.5 g. of a copolymer, made from 80 parts of lauryl methacrylate and 20 parts of beta-diethylaminoethyl methacrylate, in place of the kerosene solution of calcium naphthenates, with 44 g. of the alloy and 200 g. of ethyl chloride. Similar results were obtained.

*Example 5*

As an example of the application of the present invention to the operation of a continuous process for making tetraethyl lead, it was applied to the process in which liquid ethyl chloride and molten lead monosodium alloy, in the weight ratio of 10:3, are fed into one end of a horizontal reaction zone (the contents of which are agitated by longitudinal paddles), react therein at 90° C., and in which the reaction mass flows out of the opposite end of the reaction zone to an agitated temporary storage vessel. A solution of calcium petroleum sulfonate in kerosene, in the proportion used in Example 2, was added to the ethyl chloride before introduction into the reaction zone. No change in the yield of tetraethyl lead was observed. No agglomeration of the lead particles was observed when a sample of the reaction mass was removed and agitated for 5 hours under conditions similar to those in the reaction zone.

It will be understood that the preceding examples have been given for illustrative purposes solely and that many variations and modifications can be made therein, within the limits hereinbefore set forth, without departing from the spirit or scope of my invention. My improvement is particularly adapted for use in the continuous processes for manufacturing tetraethyl lead. The alloy may be ground or crushed by any of the well known methods and may or may not be sieved. The alloy may be in the form of small solid pellets such as are obtained by quenching molten alloy in a cool liquid, but, preferably, is in the form of such pellets obtained by quenching the molten alloy in liquid ethyl chloride in preliminary quenching apparatus or, preferably, in the reaction zone.

It will be apparent that, by my process, I have solved a serious problem in the manufacture of tetraethyl lead in a simple, economical and effective manner. Accordingly, it will be apparent that my invention constitutes a valuable advance in and contribution to the art.

I claim:
1. In the process for making tetraethyl lead by the reaction of lead monosodium alloy with an excess of liquid ethyl chloride, the improvement which comprises carrying out such reaction at a temperature of from about 80° C. to about 120° C. and a corresponding pressure of from about 107 to about 255 pounds per square inch absolute and employing from about 2 to about 6 parts by weight of ethyl chloride per part of alloy, the ethyl chloride containing from about 0.02% to about 1% by weight based on the ethyl chloride of an oil-soluble surface-active material of the class consisting of alkaline earth salts of sulfonated petroleum hydrocarbons of at least 8 carbon atoms, alkaline earth salts of naphthenic acids, fatty acid esters of hexitans in which the fatty acids contain 12 to 20 carbon atoms, and copolymers of from about 70 to 99 parts by weight of at least one polymerizable compound selected from the alkyl acrylates and alkyl methacrylates in which each alkyl group contains 10 to 18 carbon atoms with from about 30 to 1 part of at least one other polymerizable compound selected from beta-dialkylaminoethyl acrylates and beta-dialkylaminoethyl methacrylates in which each alkyl group contains 1 to 8 carbon atoms.

2. In the process for making tetraethyl lead by the reaction of lead monosodium alloy with an excess of liquid ethyl chloride, the improvement which comprises continuously feeding to a reaction zone the alloy and from about 2 to about 6 parts by weight based on the alloy of liquid ethyl chloride containing from about 0.02% to about 1% by weight based on the ethyl chloride of an oil-soluble surface-active material of the class consisting of alkaline earth salts of sulfonated petroleum hydrocarbons of at least 8 carbon atoms, alkaline earth salts of naphthenic acids, fatty acid esters of hexitans in which the fatty acids contain 12 to 20 carbon atoms, and copolymers of from about 70 to 99 parts by weight of at least one polymerizable compound selected from the alkyl acrylates and alkyl methacrylates in which each alkyl group contains 10 to 18 carbon atoms with from about 30 to 1 part of at least one other polymerizable compound selected from beta-dialkylaminoethyl acrylates and beta-dialkylaminoethyl methacrylates in which each alkyl group contains 1 to 8 carbon atoms, maintaining the mixture in the reaction zone under reacting conditions with agitation until the reaction is substantially complete, and continuously discharging the reaction mixture from the reaction zone.

3. In the process for making tetraethyl lead by the reaction of lead monosodium alloy with an excess of liquid ethyl chloride, the improvement which comprises continuously feeding to a reaction zone the alloy and from about 2 to about 6 parts by weight based on the alloy of liquid ethyl chloride containing from about 0.02% to about 1% by weight based on the ethyl chloride of an oil-soluble surface-active material of the class consisting of alkaline earth salts of sulfonated petroleum hydrocarbons of at least 8 carbon atoms, alkaline earth salts of naphthenic acids, fatty acid esters of hexitans in which the fatty acids contain 12 to 20 carbon atoms, and copolymers of from about 70 to 99 parts by weight of at least one polymerizable compound selected from the alkyl acrylates and alkyl methacrylates in which each alkyl group contains 10 to 18 carbon atoms with from about 30 to 1 part of at least one other polymerizable compound selected from beta-dialkylaminoethyl acrylates and beta-dialkylaminoethyl methacrylates in which each alkyl group contains 1 to 8 carbon atoms, maintaining the mixture in the reaction zone with agitation at a temperature of from about 80° C. to about 120° C. and at a corresponding pressure of from about 107 to about 255 pounds per square inch absolute until the reaction is substantially complete, and continuously discharging the reaction mixture from the reaction zone.

References Cited in the file of this patent

UNITED STATES PATENTS

| Number | Name | Date |
|---|---|---|
| 2,004,160 | Downing et al. | June 11, 1935 |
| 2,038,704 | Bake et al. | Apr. 28, 1936 |
| 2,316,739 | Cook et al. | Apr. 13, 1943 |
| 2,574,759 | Rodekohr et al. | Nov. 13, 1951 |